United States Patent [19]

Takegoshi et al.

[11] Patent Number: 5,675,360
[45] Date of Patent: Oct. 7, 1997

[54] INFORMATION PROCESSING APPARATUS HAVING A KEYBOARD WITH A POINTING DEVICE

[75] Inventors: Tetsuji Takegoshi, Hitachioota; Ryuichi Nemoto, Iruma; Atsuhiko Urushihara, Kokubunji; Kouichi Saito; Hidetika Kigoshi, both of Kitaibaraki; Takayuki Sutou; Minoru Funahashi, both of Hitachi; Seiji Nogami, Oomiya, all of Japan

[73] Assignee: Hitachi, Ltd., Tokyo, Japan

[21] Appl. No.: 513,522

[22] Filed: Aug. 10, 1995

[30] Foreign Application Priority Data

Aug. 19, 1994 [JP] Japan .................................. 6-195802

[51] Int. Cl.$^6$ .................................................. G09G 5/08
[52] U.S. Cl. .................. 345/167; 345/160; 345/164; 345/169; D14/115
[58] Field of Search .......................... 345/160, 163, 345/164, 167, 168, 169; 235/146; D14/115, 100

[56] References Cited

U.S. PATENT DOCUMENTS

D. 358,145   5/1995   Harada ........................... D14/100
D. 360,629   7/1995   Ho ................................. D14/100
5,207,426   5/1993   Inoue et al. .................. 273/148 B
5,473,347   12/1995  Collas et al. ................. 345/169

*Primary Examiner*—Alyssa H. Bowler
*Assistant Examiner*—John Harrity
*Attorney, Agent, or Firm*—Antonelli, Terry, Stout & Kraus, LLP.

[57] ABSTRACT

An information processing apparatus includes a main case body having installed thereon a key group at a key installation region thereof, a track ball and a selection switch (including a right switch and a left switch) are separately provided, respectively, at a right side region and a left side region of an operator side of the key installation region. The track ball, the right switch and the left switch are provided in such a manner so as an installation region of a wiring substrate. The track ball, the right switch, and the left switch can be easily operated under a key operation feeling by using both hands in a manner similar to operation of the key group. By the foregoing configuration, an increase in an occupied area of a keyboard can be reduced, and increase in a thickness of the keyboard can be restrained, thereby allowing the information processing apparatus to have superior operation characteristics, insofar as its pointing device is concerned.

12 Claims, 3 Drawing Sheets

INFORMATION PROCESSING APPARATUS HAVING A KEYBOARD WITH A POINTING DEVICE

BACKGROUND OF THE INVENTION

1. Field of the Invention

The present invention relates to an information processing apparatus such as a word processor, and in particular, to an improved pointing device suitable for an information processing apparatus such as a small scale, handy type word processor.

2. Background of the Invention

A mouse or a track ball is often used as a pointing device for an information processing apparatus such as a word processor or a personal computer.

For the track ball, similar to the mouse, a pointing cursor is moved in accordance with the generation of a movement signal issued in response to rotation of a ball of the track ball.

The track ball is used to obtain position information of the pointing cursor through an input signal derived from a selection switch. Further, in the conventional information processing apparatus, the track ball and the selection switch are disposed adjacent to one another so as to be easily operated by one hand of an operator.

The above-stated conventional track ball is suitable for a handy type, small scale information processing apparatus. The track ball is assembled and installed into a keyboard of a main case body of the information processing apparatus.

One drawback associated with conventional track balls is the necessity of having to install the track ball by distinguishing key groups, such as a character key group and a function key group. This causes an occupied area of the keyboard to necessarily become enlarged in order to accommodate the installation of the track ball on the main case body.

In order to prevent malfunction of the information processing apparatus, it is necessary to install the track ball at a remote position from the key groups, so that the track ball can be clearly operated by distinguishing the key groups on the main case body. However in this case, this approach is also undesirable because it produces an increase in the occupied area of the keyboard for installing the track ball even more substantially.

Information processing apparatuses such as note-type word processors are small in scale and thin in structure and thus are suitable and convenient for carrying. However, when the occupied area of the keyboard for installing the track ball on the main case body is enlarged for the reasons noted above a problem arises that a whole shape of the main case body including the keyboard structure of the information processing apparatus becomes correspondingly large.

A conventional lap top computer is disclosed in Japanese patent laid-open publication No. 505897/1993, for example. In this conventional lap top computer, a track ball and a selection switch are arranged adjacently on a keyboard at a central portion of an operator side on a main case body, with the selection switch comprising an upper bottom and a lower bottom.

In the above-mentioned conventional lap top computer, the upper bottom, the track ball, and the lower bottom are arranged, respectively, along the same longitudinal line. Further, the track ball and selection switch are installed on a comparatively large keyboard structure, in other words it is necessary to provide a comparatively large occupied area of the keyboard for installing the track ball and selection switch on the main case body.

SUMMARY OF THE INVENTION

An objective of the present invention is to provide an information processing apparatus wherein an increase of an occupied area of a keyboard of the information processing apparatus is reduced and a superior operation characteristic of a pointing device is obtained.

Another objective of the present invention is to provide an information processing apparatus wherein an increase of an occupied area of a keyboard of the information processing apparatus is reduced, an increase in a thickness of the keyboard is restrained, and a superior operation characteristic of a pointing device is obtained.

An information processing apparatus according to one embodiment of the present invention comprises a main case body for installing a key group on a key group installation region, and a pointing device installed on the main case body. The pointing device includes a cursor movement indication unit and a selection switch. In operating the pointing cursor moves in response to a movement signal generated by the cursor movement indication unit, and position information of the pointing cursor is obtained in response to an input of the selection switch.

The cursor movement indication unit is installed at a right side region of an operator side of the key group installation region, and the selection switch is installed at a left side region of the operator side of the key group installation region.

The information processing apparatus of the present invention comprises a character key group, an "ENTER" key installed on a right side region of an operator side of the key group, a ten key group installed on the right side region of the operator side of the key group, a cursor key group installed on the right side region of the operator side of the key group, a main case body having the ten key group and the cursor key group, with the main case body having a track ball, a pointing cursor for moving according to the rotation of the track ball, a selection switch provided on the main case body, and a right side home position key provided on the main case body. Position information of the pointing cursor is obtained in response to an input of the selection switch.

The track ball is installed at a region of an operator of the "ENTER" key, and the selection switch is installed at a region of the operator side of the key group and at a region of an outer side of the right side home position key.

The information processing apparatus may have a main case body for installing a key group at a key installation region, and a track ball provided on the main case body, in which a pointing cursor is moved in response to rotation of the track ball, and information of the pointing cursor is obtained in response to an input of a selection switch.

The track ball further is separated at a right side region of an operator side of the key group installation region, the selection switch is separated at a left side region of the operator side of the key group installation region, and both the track ball and the selection switch are installed in a manner so as to avoid an installation region of a control board.

Since the cursor movement indication unit or the track ball and the selection switch are installed by separating at the right side region and at the left side region of the operator side of the key group installation region, the operator can operate the information processing apparatus by developing a sense of feel for the pointing device similar to the feel users develop with respect to key operation, and also the pointing device can be operated by both hands of the operator.

As a result, a favorable operation characteristic of the information processing apparatus can be obtained and, because of the dispersion of the installation area for the track ball and the selection switch, enlargement in the occupied area of the keyboard can be reduced.

Further, since both the track ball and selection switch are installed in a manner so as to avoid overlap with the control board or with the wiring substrate, or to avoid the region for installing the control board or the wiring substrate, an increase in the thickness of the keyboard of the information processing apparatus can be restrained.

DESCRIPTION OF THE INVENTION

Hereinafter, one embodiment of an information processing apparatus according to the present invention will be explained with reference to the drawings.

Figure 1:
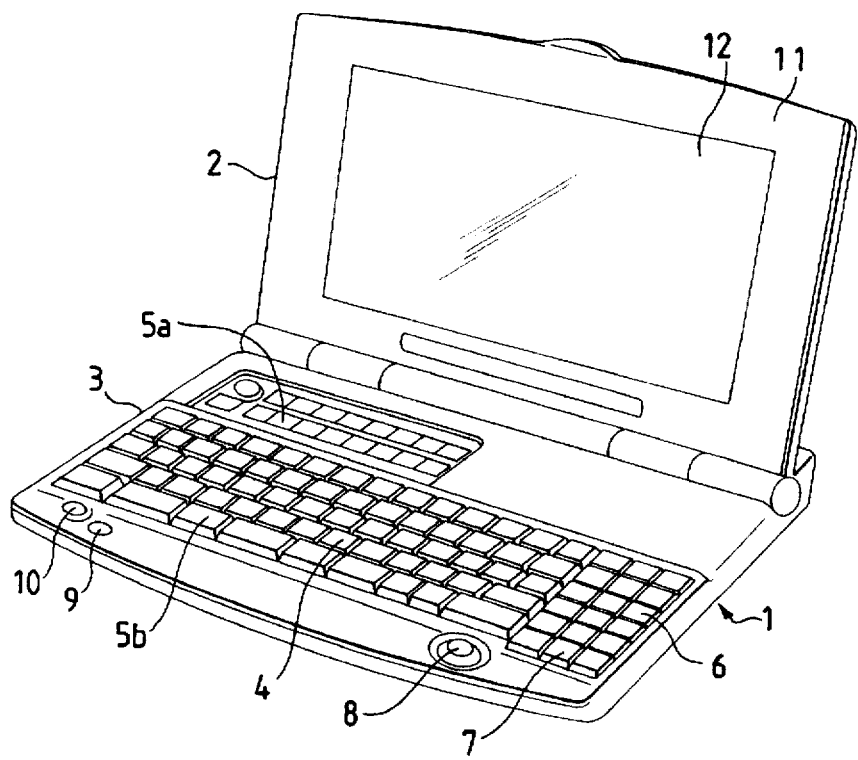
FIG. 1 is a schematic diagram showing one embodiment of a note type word processor of the information processing apparatus according to the present invention.

FIG. 1 is a schematic diagram showing one embodiment of a note-type word processor of the information processing apparatus of the present invention.

A note-type word processor of one embodiment of an information processing apparatus of the present invention comprises a main body unit 1 and a display unit 2, which is rotatively combined to a back peripheral portion of the main body unit 1. This display unit 2 is adapted to swing into a folded position with respect to the main body unit 1.

The main body unit 1 of the word processor comprises a main case body 3 and a keyboard structure provided on an upper face portion of the main case body 3. The main case body 3 has incorporated a control circuit unit and an outside memory apparatus, such as a floppy disk unit and a hard disk unit in an interior portion of the main case body 3.

The keyboard structure of the word processor comprises a character key group 4, function key groups 5a and 5b, a ten key group 6, a cursor key group 7, a pointing device which includes track ball 8 and selection switches 9 and 10. The track ball 8 is also a cursor movement indication unit. The selection switches comprise a right switch 9 for performing a designation operation and a left switch 10 for performing a release operation.

The display unit 2 comprises an auxiliary case body 11 and a display picture 12 provided on an inner side face of the auxiliary case body 11. The auxiliary case body 11 is installed so as to be freely opened or freely closed against the back peripheral portion of the main case body 3.

During the working or operating state of the word processor shown in FIG. 1, the display unit 2 is opened to an upright position at the back peripheral portion of the main body unit 1. The housing of the word processor the display unit 2 is pushed toward an operator side or a front side of the keyboard and is folded by overlapping the display unit 2 toward the upper face of the main body unit 1.

When the word processor enters into a closing state, the above stated key groups and pointing device (track ball 8, right switch 9, and left switch 10) are covered by the display unit 2.

Figure 2:
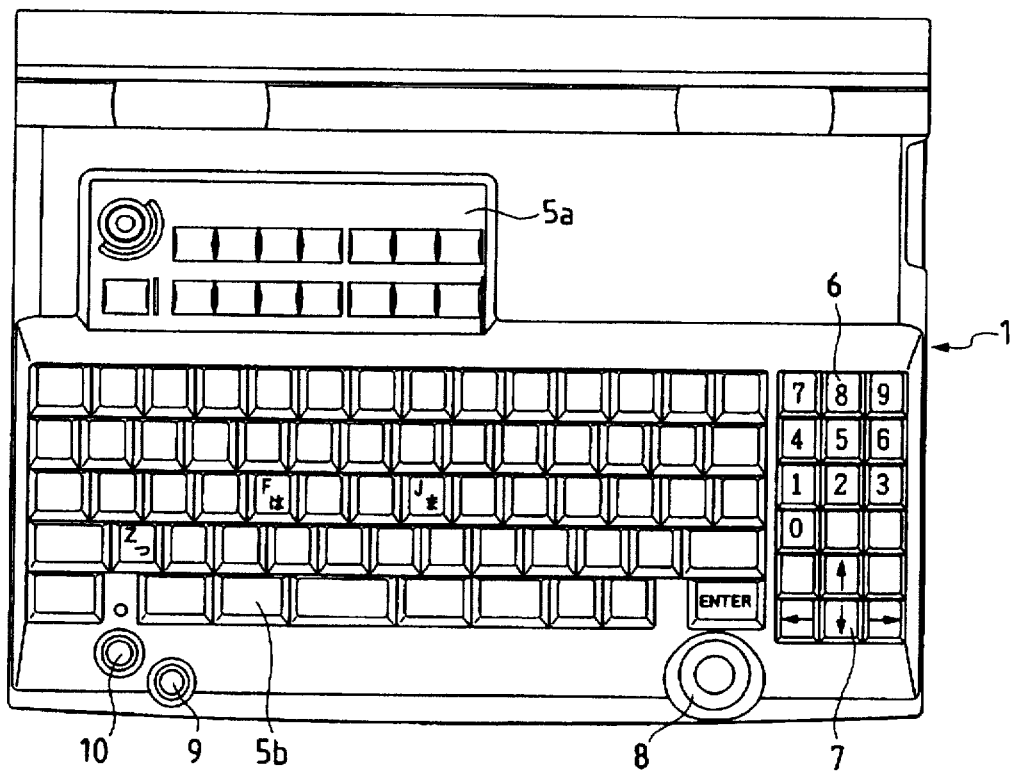
FIG. 2 is a top view showing one embodiment of a main body unit of a note type word processor of an information processing apparatus according to the present invention.

FIG. 2 is a top view showing one embodiment of a main body unit 1 of a note-type word processor of an information processing apparatus of the present invention. Shown in FIG. 2, more specifically, is a top view of the main body unit 1, with a detailed arrangement relationship of the track ball 8 as the pointing device and selection switches 9 and 10 as the pointing device on the keyboard of the main case body 3.

The track ball 8 and the selection switches 9 and 10 are separately arranged with respect each other on the keyboard of the main case body 3. The track ball 8 is arranged at a right side region of the key groups, and the selection switches 9 and 10 are arranged at a left side region of the key groups.

More specifically, the track ball 8 is positioned preferably at a right outer side region of a right side home position key e.g., "J/ま", of the character key group 4. This home position key is positioned at a central region of the keyboard and at an inner side region from the ten key group 6.

The track ball 8 preferably is positioned at the operator side region or the front side of the keyboard of the "ENTER" key. This "ENTER" key is positioned at the right end of the function key group 5b, which is positioned at the operator side or the front side of the keyboard of the character key group 4.

Further, the track ball 8 is positioned at the inner side region of the ten key group 6 and the cursor key group 7. This ten key group 6 and this cursor key group 7 are positioned at the right end side region of the keyboard.

The selection switches 9 and 10 are positioned at the right outer side region of a home position key designated "F/は". This home position key "F/は" is positioned at the left side of the character key group 4.

The selection switches 9 and 10 are positioned at the operator side or the front side of the keyboard of the character key "Z/つ"". This character key "Z/つ"" is positioned at the most front line left end side of the character key group 4.

The positions of the above stated track ball 8 and selection switches 9 and 10 correspond to positions in which the operator can advantageously operate the word processor in a natural position, by drawing a hand of an operator which is positioned at the home position key, toward the movement direction of the elbow of the operator.

Figure 3A:
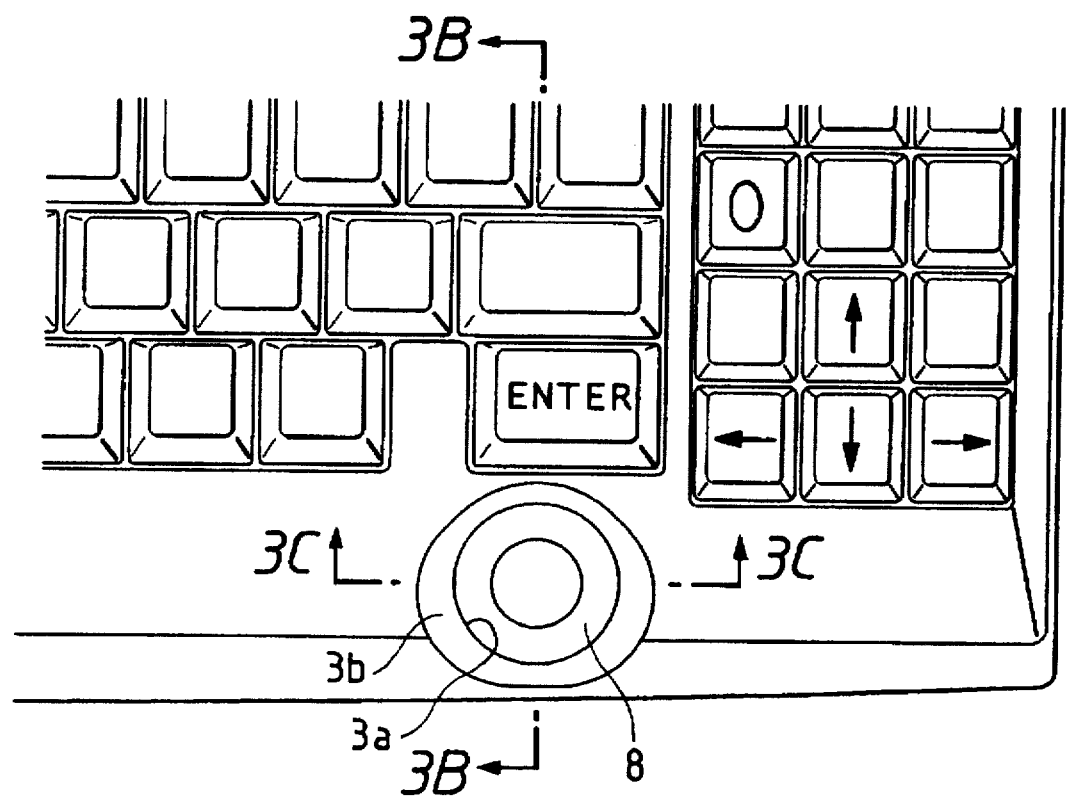
FIG. 3A is a plane view showing one embodiment of an installation structure of a track ball in one embodiment of a note-type word processor as an information processing apparatus according to the present invention.
Figure 3B:
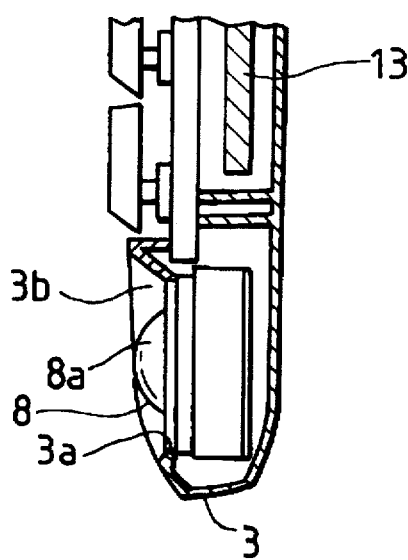
FIG. 3B is a cross-sectional view showing one embodiment of an installation structure of the track ball taken along to a line 3B—3B in FIG. 3A in one embodiment of the note type word processor as an information processing apparatus according to the present invention.
Figure 3C:
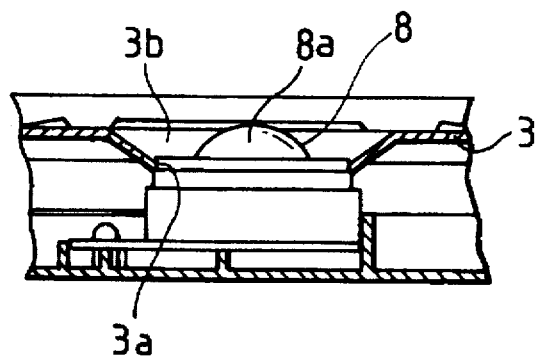
FIG. 3C is a cross-sectional view showing one embodiment of an installation structure of the track ball taken along to a line 3C—3C in FIG. 3A in one embodiment of the note type word processor as an information processing apparatus according to the present invention.

As shown in FIGS. 3A, 3B and 3C, the track ball 8 has a rotatable ball 8a installed in the interior portion of the main case body 3. The rotatable ball 8a is partially exposed from the surface of the keyboard from an opening 3a. This opening 3a is formed in the main case body 3 and is formed at a bottom portion of a dent portion 3b of the main case body 3.

The dent portion 3b of the main case body 3 has a slope face or a curved face, this slope face or the curved face being formed at the operator side portion of the main case body 3 and being curved so as to lower in turn toward the operator side direction or the front side keyboard direction.

This dent portion 3b of the main case body 3 is formed at a widened and opened wall face as not to obstruct movement of the fingers of the operator for operating the ball 8a of the track ball 8. The operator side portion of the wall face of the dent portion 3b is lowered and opened so as to be easily operable, according to the provision of the curve structure of the main case body 3.

The inner part of the wall face of the dent portion 3b is heighten and raised with an abrupt slope, so as to provide separation between the "ENTER" key and opening 3a. The slope or the curve on the wall face of the dent portion 3b is moderated at the left and right sides, and a large portion for escaping is formed in the wall face of the dent portion 3b.

The track ball 8 and selection switches 9 and 10, as the pointing device, are installed in a manner so as to avoid a control board or wiring substrate 13, provided on the main case body 3 as shown in FIG. 3B. In other words, the track ball 8 and selection switches 9 and 10 are neither positioned nor arranged on the installation region of the control board 13 on the main case body 3.

Figure 4:
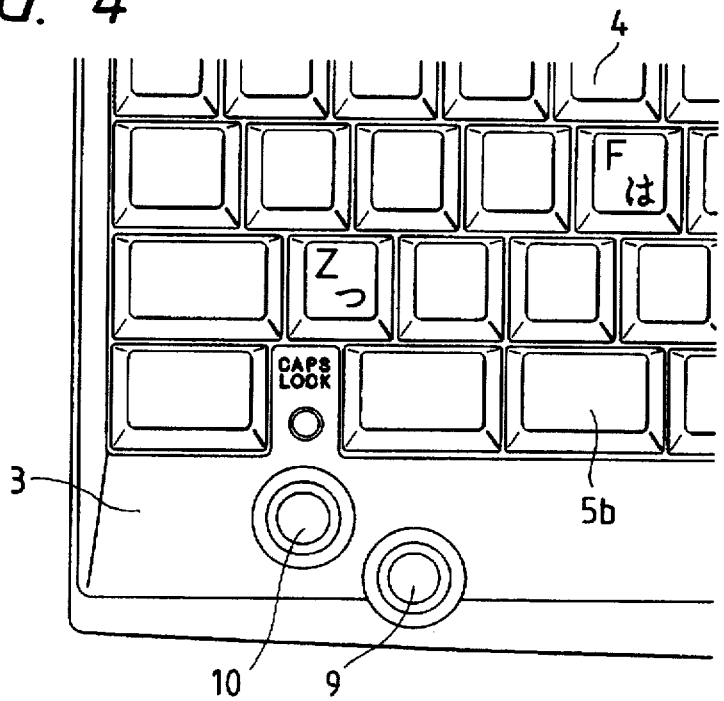
FIG. 4 is a plane view showing one embodiment of an installation structure of a selection switch in one embodiment of a note-type word processor as an information processing apparatus according to the present invention.

In addition, as shown in FIG. 4, selection switches 9 and 10 are arranged by separating the slant direction against the arrangement direction of the key groups of the keyboard. As stated in above, the selection switches comprises the right switch 9 and the left switch 10.

The left switch 10, as the selection switch, is installed on the keyboard just before the "CAPS LOCK" key. The right switch 9, as the selection switch, is installed closer toward the operator side than the left switch 10. In other words, the right switch 9, as the selection switch, is installed closer toward the front side of the keyboard than the left switch 10, as the selection switch.

As a result, right switch 9 is positioned at the right hand forefinger side and left switch 10 is positioned at the left hand forefinger side.

The region of the operator side of the key group installation region is formed to have the slope face or the curved face, the slope face or the curved face is lowered in turn toward the operator side.

The operation portion of the track ball 8 (the cursor movement indication unit) is installed in a manner so as to be exposed with the slope face or the curved face of the main case body 3, and the operation portion of the selection switch (the right switch 9 and the left switch 10) is installed in a manner so as to be exposed with the sloped face or the curved face of the main case body 3.

Figure 5:
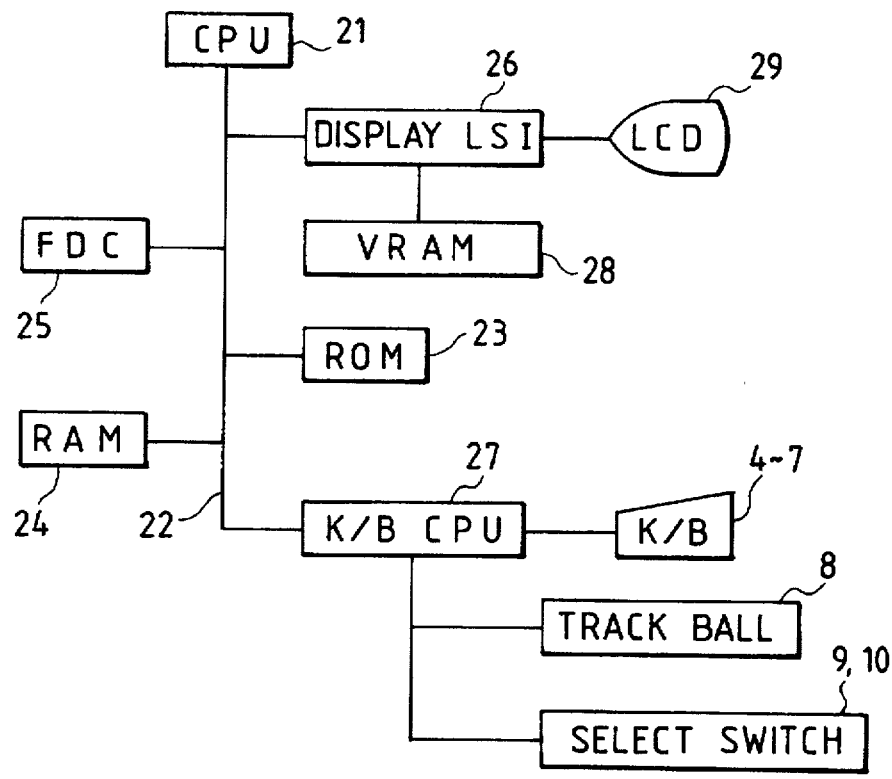
FIG. 5 is a block diagram showing one embodiment of a note-type word processor as an information processing apparatus according to the present invention.

FIG. 5 is a block diagram which shows one embodiment of a note-type word processor as an information processing apparatus according to the present invention, and which shows a control circuit apparatus which is installed in an interior portion of the main case body 3.

The control circuit apparatus comprises a main CPU (a central processing unit) 21, a bus 22, a ROM 23, a RAM 24, a floppy disk control apparatus (FDC) 25, a display control LSI 26 and a keyboard K/B CPU 27. ROM 23, RAM 24, the floppy disk control apparatus (FDC) 25, the display control LSI 26 and the keyboard K/B CPU 27 are connected to the main CPU 21 as the center through the bus 22.

ROM 23 receives a document edition program and a kana—kanji (Japanese character—Chinese character) conversion dictionary etc.. RAM 24 stores processing data. The floppy disk control apparatus (FDC) 25 controls the floppy disk apparatus which stores prepared document data, etc..

The display control LSI 26 receives display image data into a video RAM (VRAM) 28. Further, the display control LSI 26 supplies the display image data into a liquid crystal display apparatus (LCD) 29 and performs the control for displaying the display image data on the display picture 12.

The keyboard K/B CPU 27 mediates a signal input from each of the above stated key groups 4-7, the track ball 8, and selection switches 9 and 10.

The main CPU 21 executes the data processing in accordance with an input signal from key groups 4-7. The display position of the pointing cursor moves in accordance with a cursor movement signal which is inputted from the track ball 8.

When the signal from the right switch 9 is inputted, the position information of the pointing cursor is obtained and the main CPU 21 executes document edition processing and figure edition processing by recognizing the designated icon or the ruled line, etc..

The main CPU 21 further performs control for displaying the document information during the edition and the icon to the display picture 12 through the liquid crystal display apparatus (LCD) 29. The main CPU 21 receives the edited document information into the floppy disk control apparatus (FDC) and controls the floppy disk control apparatus (FDC) 25 so as to read out the stored document information.

In the word processor as constituted above, the track ball 8 as the pointing device and the selection switches 9 and 10 as the pointing device are installed at the operator side of the key group installation region such as the character key group 4 and the function key groups 5a and 5b of the keyboard on the main case body 3.

The track ball 8 and the selection switches 9 and 10 are installed at the outer side region from the home position keys "J/ま" and "F/は". The track ball 8 and the selection switches 9 and 10 are separated at the right side region of the character key group 4 and the left side region of the character key group 4.

In other words, the track ball 8 and the selection switches 9 and 10 are separated at the central side region of the keyboard and the left side region of the keyboard. Thereby, the operator can easily operate the word processor using both hands with key operation sense or key operation feeling.

Further, the track ball 8 positioned at the right hand side region is exposed from opening 3a, which is formed at the dent portion 3b. This dent portion 3b of the main case body 3 is positioned at the operator side or the front side of the keyboard of the "ENTER" key when the operator draws his right hand toward the elbow in a drawing movement direction.

The dent portion 3b of the main case body 3 is formed on the slope face or the curved face so as to lower in turn toward the operator side. Further, the wall face of the dent portion 3b of the main case body 3 is opened to widen toward the end to not obstruct the movement of the fingers for operating the ball 8a of the track ball 8.

Further, the operator side of this wall face of the dent portion 3b of the main case body 3 is lowered in accordance with the curve of the main case body 3 and is opened to easily operate from the operator side or the front side of the keyboard.

In addition, the inner part of the wall face of the dent portion 3b of the main case body 3 is raised with an abrupt slope and is separated from the "ENTER" key.

Further, at both sides, the large escaping space portion is formed on the inner part of the wall face of the dent portion 3b of the main case body 3 by loosing forming the slope. Thereby, the ball operation by the operator can be easily performed with the fingers on the right hand.

Further, the selection switches 9 and 10, positioned at the left side region of the keyboard, are positioned by separating the slant direction against the arrangement direction of key groups 4–7.

In the above case, when the left hand of the operator is drawn toward the elbow direction at the operator side slope region of the "Z/っ"" key, the right switch 9 is positioned at the forefinger side of the left hand and the left switch 10 is positioned at the middle finger of the left hand.

Accordingly, so as to operate the selection switches 9 and 10 (the right switch 9 and the left switch 10), the operator can easily operate the word processor using the forefinger and the middle finger of the left hand.

Further, the track ball 8 and the selection switches 9 and 10 are separated at the right side region of the operator side and the left side region of the operator side of key groups 4–7. Also, the track ball 8 and the selection switches 9 and 10 are installed in such a manner so as to avoid the control board or the wire substrate 13.

As a result, in accordance with the dispersion of the regions for installing the track ball and the selection switches 9 and 10, an increase in the occupied area of the keyboard can be reduced and an increase in the thickness of the keyboard can be restrained.

According to the present invention, the cursor movement indication unit or the track ball and the selection switches 9 and 10 are installed by separating the right side region of the operator side and the left side region of the operator side of the key groups installation regions.

As a result, an increase in the occupied area of the keyboard in the information processing apparatus can be reduced and the information processing apparatus having the superior operation characteristic pointing device can be realized.

Further, according to the present invention, since the track ball and the selection switches are installed in a manner to avoid overlap with the control board or the wiring substrate, an increase in the thickness of the keyboard can be reduced, and consequently, a thin and small scale information processing apparatus can be realized.

In the above stated embodiment of the word processor an the information processing apparatus according to the present invention, the track ball is arranged at the right side of the key groups on the keyboard and the selection switch (the right switch and the left switch) is arranged at the left side of the key groups of the keyboard.

However, it may constitute to arrange the track ball at the left side of the key groups of the keyboard and the selection switch (the right switch and the left switch) at the right side of the key groups of the keyboard.

We claim:

1. An information processing apparatus comprising:

a main case body for installing a key group on a key group installation region;

a pointing device installed on said main case body, said pointing device comprising a cursor movement indication unit and a selection switch;

a pointing cursor moved in response to a movement signal of said cursor movement indication unit of said pointing device;

wherein position information of said pointing cursor is obtained in response to an input of said selection switch, wherein said cursor movement indication unit is installed at a right side region of an operator side of said key group installation region, and wherein said selection switch is installed at a left side region of the operator side of said key group installation region, wherein said cursor movement indication unit is positioned at an outer side region of a home position key of said key group, and said selection switch is positioned at the outer side region of the home position key of said key group.

2. An information processing apparatus according to claim 1, wherein said selection switch comprises a right switch and a left switch, said right switch is separately arranged toward a slant direction with a key group arrangement direction, and said left switch is separately arranged toward the slant direction with the key group arrangement direction.

3. An information processing apparatus according to any of claims 1–5, wherein said pointing device is a track ball and said selection switch, and said cursor movement indication unit is said track ball.

4. An information processing apparatus comprising:

a main case body for installing a key group on a key group installation region;

a pointing device installed on said main case body, said pointing device comprising a cursor movement indication unit and a selection switch;

a pointing cursor moved in response to a movement signal of said cursor movement indication unit of said pointing device;

wherein position information of said pointing cursor is obtained in response to an input of said selection switch, wherein said cursor movement indication unit is installed at a right side region of an operator side of said key group installation region, and wherein said selection switch is installed at a left side region of the operator side of said key group installation region, wherein said cursor movement indication unit is adjacently arranged to an "ENTER" key at a region of the operator side of the "ENTER" key.

5. An information processing apparatus comprising:

a main case body for installing a key group on a key group installation region;

a pointing device installed on said main case body, said pointing device comprising a cursor movement indication unit and a selection switch;

a pointing cursor moved in response to a movement signal of said cursor movement indication unit of said pointing device;

wherein position information of said pointing cursor is obtained in response to an input of said selection switch, wherein said cursor movement indication unit is installed at a right side region of an operator side of said key group installation region, and wherein said selection switch is installed at a left side region of the operator side of said key group installation region, wherein a region of an operator side of said key group installation region is formed to have a curved face, said curved face is lowered in turn toward the operator side, an operation portion of said cursor movement indication unit is installed to be exposed with said curved face, and an operation portion of said selection switch is installed to be exposed with said curved face.

6. An information processing apparatus comprising:

a main case body for installing a key group on a key group installation region;

a pointing device installed on said main case body, said pointing device comprising a cursor movement indication unit and a selection switch;

a pointing cursor moved in response to a movement signal of said cursor movement indication unit of said pointing device;

wherein position information of said pointing cursor is obtained in response to an input of said selection switch, wherein said cursor movement indication unit is installed at a right side region of an operator side of said key group installation region, and wherein said selection switch is installed at a left side region of the operator side of said key group installation region, wherein an escape portion is formed on said curved face, said escape portion is faced to an expose portion of said track ball, and said escape portion is made large at an operator side and at both side portions.

7. An information processing apparatus comprising:

a character key group;

an "ENTER" key installed on a right side region of an operator side of said key group;

a ten key group installed on the right side region of the operator side of said key group;

a cursor key group installed on the right side region of the operator side of said key group;

a main case body having said ten key group and said cursor key group, said main case body having a track ball;

a pointing cursor for moving according to the rotation of said track ball;

a selection switch provided on said main case body; and a right side home position key provided on said main case body;

wherein position information of said pointing cursor is obtained in response to an input of said selection switch, wherein said track ball is installed at a region of an operator of said "ENTER" key, and wherein said selection switch is installed at a region of the operator side of said key group and said selection switch further is installed at a region of an outer side of said right side home position key.

8. An information processing apparatus according to claim 7, wherein a region for installing said track ball and said selection switch is formed with a curved face, and said curved face is lowered in turn toward the operator side.

9. An information processing apparatus according to claim 7, wherein said selection switch comprises a right switch and a left switch, said right switch is separately arranged toward a slant direction with a key group arrangement direction, and said left switch is separately arranged toward the slant direction with the key group arrangement direction.

10. An information processing apparatus according to claim 7, wherein said track ball and said selection switch are separately positioned at an outer side from both home position keys of said key group.

11. An information processing apparatus having a main case body for installing a key group at a key installation region, and a track ball provided on said main case body;

wherein a pointing cursor is moved in response to the rotation of said track ball, and an information of said pointing cursor is obtained in response to an input of a selection switch, wherein said track ball is separated at a right side region of an operator side of said key group installation region, said selection switch is separated at a left side region of the operator side of said key group installation region, and both said track ball and said selection switch are installed in a manner so as to avoid an installation region of a control board.

12. An information processing apparats comprising:

a main case body having a key group on a key group installation region;

a pointing device installed on said main case body, said pointing device comprising a cursor movement indication unit and a selection switch;

a pointing cursor moved in response to a movement signal of said cursor movement indication unit of said pointing device, wherein position information of said pointing cursor is obtained in response to an input of said selection switch, wherein said cursor movement indication unit is installed at one side region of an operator side of said key group installation region, wherein said selection switch is installed at another side region of the operator side of said key group installation region, and wherein said cursor movement indication unit and said selection switch are remotely arranged, relative to said key group installation region, so that said cursor movement indication unit and said selection switch are separated by a distance sufficient to preclude said cursor movement indication unit and said selection switch from being operated simultaneously by one hand.

* * * * *